US011922210B2

(12) United States Patent
Veeningen et al.

(10) Patent No.: US 11,922,210 B2
(45) Date of Patent: Mar. 5, 2024

(54) MULTIPARTY COMPUTATION SCHEDULING

(71) Applicant: KONINKLIJKE PHILIPS N.V., Eindhoven (NL)

(72) Inventors: Meilof Geert Veeningen, Eindhoven (NL); Peter Petrus Van Liesdonk, Eindhoven (NL); Sebastiaan Jacobus Antonius De Hoogh, Noord Brabant (NL)

(73) Assignee: Koninklijke Philips N.V., Eindhoven (NL)

( * ) Notice: Subject to any disclaimer, the term of this patent is extended or adjusted under 35 U.S.C. 154(b) by 502 days.

(21) Appl. No.: 16/757,562

(22) PCT Filed: Dec. 4, 2018

(86) PCT No.: PCT/EP2018/083535
§ 371 (c)(1),
(2) Date: Apr. 20, 2020

(87) PCT Pub. No.: WO2019/110609
PCT Pub. Date: Jun. 13, 2019

(65) Prior Publication Data
US 2021/0373937 A1 Dec. 2, 2021

Related U.S. Application Data

(60) Provisional application No. 62/594,761, filed on Dec. 5, 2017.

(51) Int. Cl.
*G06F 9/48* (2006.01)

(52) U.S. Cl.
CPC ............ *G06F 9/485* (2013.01); *G06F 9/4881* (2013.01)

(58) Field of Classification Search
CPC .............................. G06F 9/485; G06F 9/4881
See application file for complete search history.

(56) References Cited

U.S. PATENT DOCUMENTS

| 8,037,475 B1 * | 10/2011 | Jackson ................ G06F 9/5027 709/224 |
| 10,002,024 B2 * | 6/2018 | Di Balsamo .......... G06F 9/5005 |

(Continued)

OTHER PUBLICATIONS

De Hoogh, S. "Design of large scale applications of secure multiparty computation: secure linear programming". PhD thesis, EIndhoven University of Technology, 2012. Abstract.

(Continued)

*Primary Examiner* — Benjamin C Wu

(57) ABSTRACT

Various embodiments include a coordinator node for coordinating a multiparty computation (MPC) on one or more datasets. The system comprises a plurality of client nodes, one or more datasets and a plurality of computation nodes. Client nodes may include at least one dataset and/or at least one computation node that can operate as a party to an MPC. The coordinator node is configured to receive a request for an MPC on one or more of the datasets from a requesting node, the MPC including the evaluation of at least one function by two or more computation nodes from different client nodes; determine a computation schedule for the MPC, the computation schedule indicating which client nodes of the plurality of client nodes are to participate in the MPC; send at least part of the determined computation schedule to at least one of the client nodes indicated in the determined computation schedule.

25 Claims, 4 Drawing Sheets

(56) References Cited

U.S. PATENT DOCUMENTS

| | | | |
|---|---|---|---|
| 10,362,105 B1* | 7/2019 | DeMarco | H04L 67/1065 |
| 11,646,876 B2* | 5/2023 | Veeningen | H04L 9/085 |
| | | | 713/168 |
| 11,836,273 B2* | 12/2023 | Veeningen | G06F 21/64 |
| 2007/0094662 A1 | 4/2007 | Harper et al. | |
| 2007/0124363 A1 | 5/2007 | Gaudette et al. | |
| 2010/0122256 A1* | 5/2010 | Darrington | G06F 9/4881 |
| | | | 718/102 |
| 2010/0287283 A1* | 11/2010 | Jackson | G06F 9/5072 |
| | | | 709/226 |
| 2011/0099553 A1* | 4/2011 | Agarwal | G06F 9/4881 |
| | | | 718/105 |
| 2015/0207759 A1* | 7/2015 | Tomita | G06F 9/4843 |
| | | | 709/201 |
| 2015/0339620 A1* | 11/2015 | Esposito | G06Q 10/1093 |
| | | | 705/7.16 |
| 2016/0119434 A1* | 4/2016 | Dong | H04L 67/63 |
| | | | 709/220 |
| 2017/0116035 A1* | 4/2017 | Nilsson | G06F 9/5011 |
| 2017/0201434 A1* | 7/2017 | Liang | H04L 43/16 |
| 2018/0041600 A1* | 2/2018 | Aikoh | G06F 11/20 |
| 2019/0129830 A1* | 5/2019 | Foster, Jr. | H04L 41/0813 |
| 2020/0117504 A1* | 4/2020 | Bahl | G06F 9/4881 |
| 2020/0159540 A1* | 5/2020 | Oidate | G06F 9/3004 |

OTHER PUBLICATIONS

Feldman, P. "A practical scheme for non-interactive verifiable secret sharing." In 28th Annual Symposium on Foundations of Computer Science, Los Angeles, CA, Oct. 27-29, 1987, pp. 427-437, 1987.
International Search Report for PCT/EP2018/083535 dated Dec. 4, 2018.

* cited by examiner

MULTIPARTY COMPUTATION SCHEDULING

CROSS-REFERENCE TO PRIOR APPLICATIONS

This application is the U.S. National Phase application under 35 U.S.C. § 371 of International Application No. PCT/EP2018/083535, filed on Dec. 4, 2018, which claims the benefit of U.S. Patent Application No. 62/594,761, filed on Dec. 5, 2017. These applications are hereby incorporated by reference herein.

TECHNICAL FIELD

The disclosure relates to multiparty computations, and in particular to a node for coordinating a multiparty computation on one or more datasets, a node for performing part of a multiparty computation on the one or more datasets, and methods of operating the same.

BACKGROUND

The recent developments of Big Data has given rise to an almost unlimited amount of data that can be potentially used to make better decisions. Data analysis algorithms make it possible to perform complex analysis of this data and find trends and anomalies. Such an analysis allows refined conclusions about current events and predictions about future events to be made. This could lead to a huge impact in domains such as healthcare (for example based on an analysis of patient information) and finance (for example based on an analysis of trading data).

However, the data to be the subject of this sort of data analysis is often collected by a wide variety of companies and institutions, for a wide variety of reasons, and is not typically available in a single location where it can be analysed. There are many reasons why such information cannot easily be stored or combined in a single location. One obvious concern is privacy; there are strong legal constraints on how privacy-sensitive information can be used (particularly for healthcare-related information), but other concerns are that certain data is valuable or classified, or the owner simply does not want to release it. These concerns are in direct conflict with a desire to perform data analysis.

Multiparty computation (MPC) techniques allow the computation of a joint function on sensitive (private) inputs from mutually distrusting parties without requiring those parties to disclose these inputs to a trusted third party or to each other (thus preserving the privacy of these inputs). Cryptographic protocols ensure that no participating party (or coalition of parties) learns anything from this computation except its intended part of the computation outcome.

As an example use case, consider distributed medical research. Here, multiple hospitals may have medical data, and an objective is to allow statistical medical research (e.g., the computation of averages or correlations) on their joint datasets, without the need to share these datasets to each other or another party in an unencrypted form.

SUMMARY

Multiparty computation is only practically possible when a computation is distributed between a small number of workers—typically, two or three. However, in many settings of MPC, such as distributed medical research, the number of parties who have sensitive inputs exceeds this number of workers. Moreover, the set of parties with relevant inputs differs from computation to computation (e.g. depending on which hospitals have relevant datasets) as well as in time (as new hospitals are introduced to the system or hospitals make new datasets available).

In traditional deployments of MPC in such settings, the computation is outsourced to a small, fixed number of workers to whom the parties upload their datasets once (e.g., encrypted or secret-shared), and then computations on the data are performed by these workers, without further involvement by the inputters. The workers also have the responsibility to decide which recipients are entitled to get which query results. However, this traditional approach has a number of disadvantages. Firstly, it does not allow the use of computational resources available at various participating parties (e.g., hospitals, cloud providers, etc.), and requires all stakeholders in the system to agree and rely on two or three fixed, independent parties to perform all computations, which is difficult to do in practice. Secondly, it does not allow new parties delivering additional computational resources to be dynamically added into the system. Thirdly, it does not allow parties providing datasets to control the use of their data after the data has been uploaded into the system. Fourthly, requiring a one-time upload of the data to a few fixed parties does not allow processing 'close' to the data to be performed, e.g., on unencrypted data at the source or on encrypted data between geographically close data providers.

On the other hand, a fully distributed approach where the researcher could directly request a MPC to take place between the holders of various datasets is also not optimum. For example, it is not possible to enforce system-wide policies on what queries are allowed, e.g., "researcher X is only allowed to make 100 queries on any dataset per day".

There is therefore a need for improvements in the execution of multiparty computations that addresses one or more of the above deficiencies with existing techniques.

According to the techniques described herein, a coordinator node is proposed that coordinates a multiparty computation on one or more datasets in a system, but that does not hold or handle the sensitive information itself. The coordinator node can flexibly schedule different parts of a secure computation (an MPC) among the potentially many parties participating in the system, thereby eliminating the need to fix two or three parties beforehand and allowing for new parties to be dynamically added into, or removed from, the system. In particular embodiments of the techniques, the coordinator node can check compliance of queries or requests for an MPC to be performed with system-wide policies. In other particular embodiments, the coordinator node is able to select parties for the MPC based on their closeness to the data needed for the MPC. In yet other particular embodiments, the coordinator node can allow providers or holders of datasets used in the multiparty computation to check whether computations adhere to their policies (thereby giving the dataset holders control over their data), and allow the providers or holders of datasets to perform local processing directly on their datasets (thereby avoiding the need to perform this processing on encrypted datasets).

According to a first specific aspect, there is provided a coordinator node for coordinating a multiparty computation on one or more datasets in a system, wherein the system includes a plurality of client nodes, one or more datasets and a plurality of computation nodes, wherein each client node includes one or both of at least one dataset and at least one computation node that can operate as a party to a multiparty computation, wherein the coordinator node is configured to receive a request for a multiparty computation on one or more of the datasets from a requesting node, the multiparty computation requiring the evaluation of at least one function by two or more computation nodes from different client nodes; determine a computation schedule for the multiparty computation, the computation schedule indicating which client nodes of the plurality of client nodes are to participate in the multiparty computation; and send at least part of the determined computation schedule to at least one of the client nodes indicated in the determined computation schedule.

In some embodiments, the coordinator node is further configured to check that the requested multiparty computation on the one or more of the datasets is permitted before determining the computation schedule. In these embodiments, the coordinator node can be configured to check that the multiparty computation is permitted based on a global policy for the system. The coordinator node may be configured to check that the multiparty computation is permitted based on one or more of an identity of the requesting node, a number of requests received from the requesting node in a predetermined time period, and the identity of the one or more datasets that the multiparty computation is to be performed on.

In some embodiments, the coordinator node is configured to send any part of the determined computation schedule indicating a particular client node to that client node. In alternative embodiments, the coordinator node is configured to send the determined computation schedule to each of the client nodes indicated in the computation schedule.

In some embodiments, the coordinator node is further configured to receive an input to the multiparty computation from the requesting node; and provide the input to one or more of the client nodes indicated in the computation schedule.

In some embodiments, the multiparty computation requires the evaluation of a plurality of functions by two or more client nodes, and wherein the determined computation schedule indicates a respective set of two or more client nodes of the plurality of client nodes for each of the functions.

In some embodiments, the computation schedule indicates, for each client node that is to evaluate a function in the multiparty computation, (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

In some embodiments, the computation schedule further indicates one or more client nodes that are to provide a dataset for the multiparty computation.

In some embodiments, the multiparty computation further includes at least one preprocessing function that is to be performed on one of the one or more datasets, and wherein the computation schedule further indicates a client node that is to perform the preprocessing function on the one of the one or more datasets.

In some embodiments, the coordinator node is further configured to monitor the availability of the plurality of client nodes for multiparty computation over time; and wherein the coordinator node is configured to determine the computation schedule based on client nodes that are currently available. In alternative embodiments, the coordinator node is configured to determine the computation schedule by determining which client nodes are to evaluate a next function in the multiparty computation on completion of the evaluation of a previous function in the multiparty computation. In these embodiments, the coordinator node is further configured to monitor the availability of the client nodes for multiparty computation over time; and determine which client nodes are to evaluate each function in the multiparty computation on completion of the evaluation of the previous function in the multiparty computation based on the availability of the client nodes.

In some embodiments, the coordinator node is configured to determine the computation schedule by determining a set of possible computation schedules for the multiparty computation, each possible computation schedule indicating client nodes in the plurality of client nodes that could evaluate each function in the multiparty computation; evaluating each possible computation schedule according to one or more criteria; and determining the computation schedule based on the evaluation. In these embodiments, the coordinator node is configured to discard any possible computation schedule that does not meet one or more of the one or more criteria; and to determine the computation schedule based on the remaining possible computation schedules.

In alternative embodiments, the coordinator node is configured to determine the computation schedule by determining a set of possible committees for the function requiring evaluation by two or more computation nodes from different client nodes, each possible committee including two or more client nodes that could evaluate each function in the multiparty computation; evaluating each possible committee according to one or more criteria; determining a committee for the function based on the evaluation; and determining the computation schedule including the determined committee. In these embodiments, the coordinator node is configured to discard any possible committee that does not meet one or more of the one or more criteria; and to determine the committee for the function based on the remaining possible committees.

In some embodiments, the coordinator node is further configured to request one or more of the client nodes indicated in the computation schedule to store their internal state after evaluation of said function.

In some embodiments, the computation schedule indicates, for a client node that includes a plurality of computation nodes that is to evaluate a function in the multiparty computation, which computation node is to evaluate the function.

According to a second aspect, there is provided a method of operating a coordinator node in a system to coordinate a multiparty computation on one or more datasets, wherein the system includes a plurality of client nodes, one or more datasets and a plurality of computation nodes, wherein each client node includes one or both of at least one dataset and at least one computation node that can operate as a party to a multiparty computation, wherein the method includes receiving a request for a multiparty computation on one or more of the datasets from a requesting node, the multiparty computation requiring the evaluation of at least one function by two or more computation nodes from different client nodes; determining a computation schedule for the multiparty computation, the computation schedule indicating which client nodes of the plurality of client nodes are to participate in the multiparty computation; and sending at least part of the determined computation schedule to at least one of the client nodes indicated in the determined computation schedule.

In some embodiments, the method further includes checking that the requested multiparty computation on the one or more of the datasets is permitted before determining the computation schedule. In these embodiments, the step of checking can include checking that the multiparty computation is permitted based on a global policy for the system. The step of checking may include checking that the multiparty computation is permitted based on one or more of an identity of the requesting node, a number of requests received from the requesting node in a predetermined time period, and the identity of the one or more datasets that the multiparty computation is to be performed on.

In some embodiments, the step of sending includes sending any part of the determined computation schedule indicating a particular client node to that client node. In alternative embodiments, the step of sending includes sending the determined computation schedule to each of the client nodes indicated in the computation schedule.

In some embodiments, the method further includes receiving an input to the multiparty computation from the requesting node; and providing the input to one or more of the client nodes indicated in the computation schedule.

In some embodiments, the multiparty computation requires the evaluation of a plurality of functions by two or more client nodes, and wherein the determined computation schedule indicates a respective set of two or more client nodes of the plurality of client nodes for each of the functions.

In some embodiments, the computation schedule indicates, for each client node that is to evaluate a function in the multiparty computation, (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

In some embodiments, the computation schedule further indicates one or more client nodes that are to provide a dataset for the multiparty computation.

In some embodiments, the multiparty computation further includes at least one preprocessing function that is to be performed on one of the one or more datasets, and wherein the computation schedule further indicates a client node that is to perform the preprocessing function on the one of the one or more datasets.

In some embodiments, the method further includes monitoring the availability of the plurality of client nodes for multiparty computation over time; wherein the step of determining includes determining the computation schedule based on client nodes that are currently available. In alternative embodiments, the step of determining includes determining the computation schedule by determining which client nodes are to evaluate a next function in the multiparty computation on completion of the evaluation of a previous function in the multiparty computation. In these embodiments, the method further includes monitoring the availability of the client nodes for multiparty computation over time; and determining which client nodes are to evaluate each function in the multiparty computation on completion of the evaluation of the previous function in the multiparty computation based on the availability of the client nodes.

In some embodiments, the step of determining the computation schedule includes determining a set of possible computation schedules for the multiparty computation, each possible computation schedule indicating client nodes in the plurality of client nodes that could evaluate each function in the multiparty computation; evaluating each possible computation schedule according to one or more criteria; and determining the computation schedule based on the evaluation. In these embodiments, the step of determining the computation schedule further includes discarding any possible computation schedule that does not meet one or more of the one or more criteria; and determining the computation schedule based on the remaining possible computation schedules.

In alternative embodiments, the step of determining the computation schedule includes determining a set of possible committees for the function requiring evaluation by two or more computation nodes from different client nodes, each possible committee including two or more client nodes that could evaluate each function in the multiparty computation; evaluating each possible committee according to one or more criteria; determining a committee for the function based on the evaluation; and determining the computation schedule including the determined committee. In these embodiments, the step of determining the computation schedule further includes discarding any possible committee that does not meet one or more of the one or more criteria; and determining the committee for the function based on the remaining possible committees.

In some embodiments, the method further includes request one or more of the client nodes indicated in the computation schedule to store their internal state after evaluation of said function.

In some embodiments, the computation schedule indicates, for a client node that includes a plurality of computation nodes that is to evaluate a function in the multiparty computation, which computation node is to evaluate the function.

According to a third aspect, there is provided a computer program product including a computer readable medium having computer readable code embodied therein, the computer readable code being configured such that, on execution by a suitable computer or processor, the computer or processor is caused to perform the method according to the second aspect or any embodiment thereof.

According to a fourth aspect, there is provided a client node for use in a system, wherein the system includes a coordinator node and one or more other client nodes, wherein the client node includes at least one computation node that can operate as a party to a multiparty computation, wherein the client node is configured to receive at least part of a computation schedule from the coordinator node, the computation schedule indicating that the client node is to evaluate a function in the multiparty computation with at least one other client node; receive an input for the function; and use at least one of the computation nodes to evaluate the function in the multiparty computation with the at least one other client node using the received input.

In some embodiments, the client node includes a plurality of computation nodes, and the client node is further configured to determine which of the plurality of computation nodes is to evaluate the function in the multiparty computation.

In some embodiments, the client node is further configured to receive an input to the multiparty computation from the coordinator node.

In some embodiments, the computation schedule indicates (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

In some embodiments, the input for the function includes one or both of a dataset and the output of another function in the multiparty computation.

In some embodiments, the client node is further configured to indicate the availability of the client node for multiparty computations over time.

In some embodiments, the client node is further configured to receive a request from the coordinator node to store the internal state of the client node after evaluation of said function. In these embodiments, the client node is further configured to send the stored internal state of the client node to another client node.

In some embodiments, the client node is further configured to send the output of the evaluation of the function in the multiparty computation with the at least one other client node to another client node or to a node that requested the multiparty computation.

According to a fifth aspect, there is provided a method of operating a client node in a system, wherein the system includes a coordinator node and one or more other client nodes, wherein the client node includes at least one computation node that can operate as a party to a multiparty computation, wherein the method includes receiving at least part of a computation schedule from the coordinator node, the computation schedule indicating that the client node is to evaluate a function in the multiparty computation with at least one other client node; receiving an input for the function; and using at least one of the computation nodes to evaluate the function in the multiparty computation with the at least one other client node using the received input.

In some embodiments, the client node includes a plurality of computation nodes, and the method further includes determining which of the plurality of computation nodes is to evaluate the function in the multiparty computation.

In some embodiments, the method further includes receiving an input to the multiparty computation from the coordinator node.

In some embodiments, the computation schedule indicates (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

In some embodiments, the input for the function includes one or both of a dataset and the output of another function in the multiparty computation.

In some embodiments, the method further includes indicating the availability of the client node for multiparty computations over time.

In some embodiments, the method further includes receiving a request from the coordinator node to store the internal state of the client node after evaluation of said function. In these embodiments, the method further includes sending the stored internal state of the client node to another client node.

In some embodiments, the method further includes sending the output of the evaluation of the function in the multiparty computation with the at least one other client node to another client node or to a node that requested the multiparty computation.

According to a sixth aspect, there is provided a computer program product including a computer readable medium having computer readable code embodied therein, the computer readable code being configured such that, on execution by a suitable computer or processor, the computer or processor is caused to perform the method according to the fifth aspect or any embodiment thereof.

These and other aspects and embodiments will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION

Figure 1:
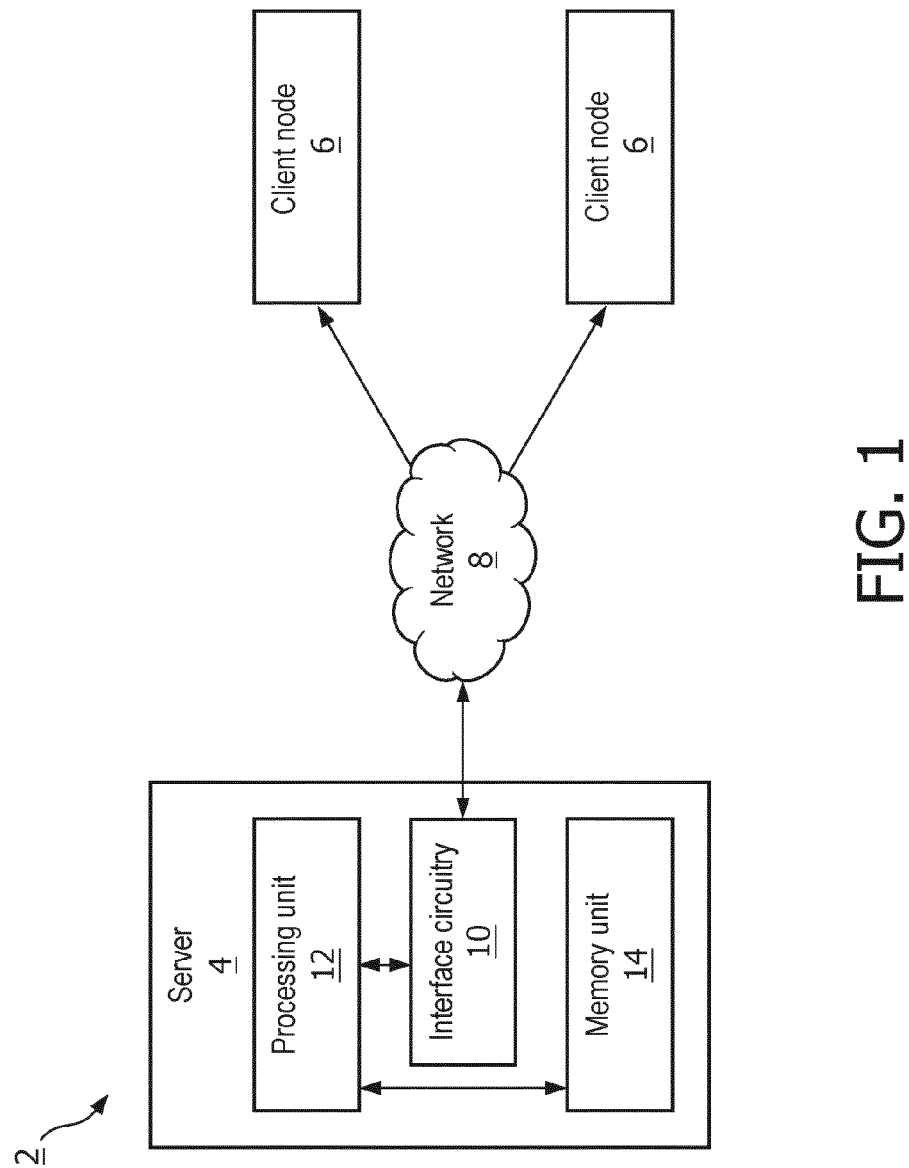
FIG. 1 is a block diagram of a system including a coordinator node and a plurality of client nodes.

FIG. 1 is a block diagram of a system 2 in which the techniques and principles described herein may be implemented. The system 2 includes a coordinator node 4, and one or more other parties 6, which are referred to herein as client nodes 6. The coordinator node 4 is provided to coordinate a multiparty computation (MPC) on one or more datasets, and each client node 6 provides a dataset for the computation, processing resources for performing a part of the computation, or both. The coordinator node 4 is also for keeping track of available client nodes 6 and datasets in the system 2. Although FIG. 1 shows two client nodes 6, it will be appreciated that a system 2 can include more or less than two client nodes 6.

The coordinator node 4 and client nodes 6 are interconnected via a network 8, such as the Internet, and thus may be located at respectively different locations. Of course, it will be appreciated that one or more of the client nodes 6 may be local to the coordinator node 8, and interconnected via a wired or wireless connection.

The coordinator node 4 can be any type of electronic device or computing device that client nodes 6 can connect to. For example the coordinator node 4 can be, or be part of any suitable type of electronic device or computing device, such as a server, computer, laptop, smart phone, etc.

The coordinator node 4 includes interface circuitry 10 for enabling a data connection to other devices, such as the client nodes 6. In particular the interface circuitry 10 can enable a connection between the coordinator node 4 and the network 8, such as the Internet, via any desirable wired or wireless communication protocol. The coordinator node 4 further includes a processing unit 12 for performing operations on data and for generally controlling the operation of the coordinator node 4. The coordinator node 4 further includes a memory unit 14 for storing any data required for the execution of the techniques described herein and for storing computer program code for causing the processing unit 12 to perform method steps as described in more detail below.

The processing unit 12 can be implemented in numerous ways, with software and/or hardware, to perform the various functions described herein. The processing unit 12 may include one or more microprocessors or digital signal processor (DSPs) that may be programmed using software or computer program code to perform the required functions and/or to control components of the processing unit 10 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 14 can include any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

As noted above, each client node 6 can provide a dataset, processing resources for performing a part of the MPC, or both. Each client node 6 is considered to be an independent entity from the other client nodes 6, and the client nodes 6 do not collude with each other. A client node 6 may be a single electronic device or computing device, or it can be a collection of separate devices, for example a set of electronic devices and/or computing devices. A client node 6 may be located at or be associated with a hospital, a geographical area, located at a data storage facility, located at a server farm, etc. For example a first client node 6 may be associated with 'Hospital A', a second client node 6 may be associated with 'Hospital B', a third client node 6 may be associated with 'Hospital C', and a fourth client node 6 may be associated with 'Cloud Provider D'.

Figure 2:
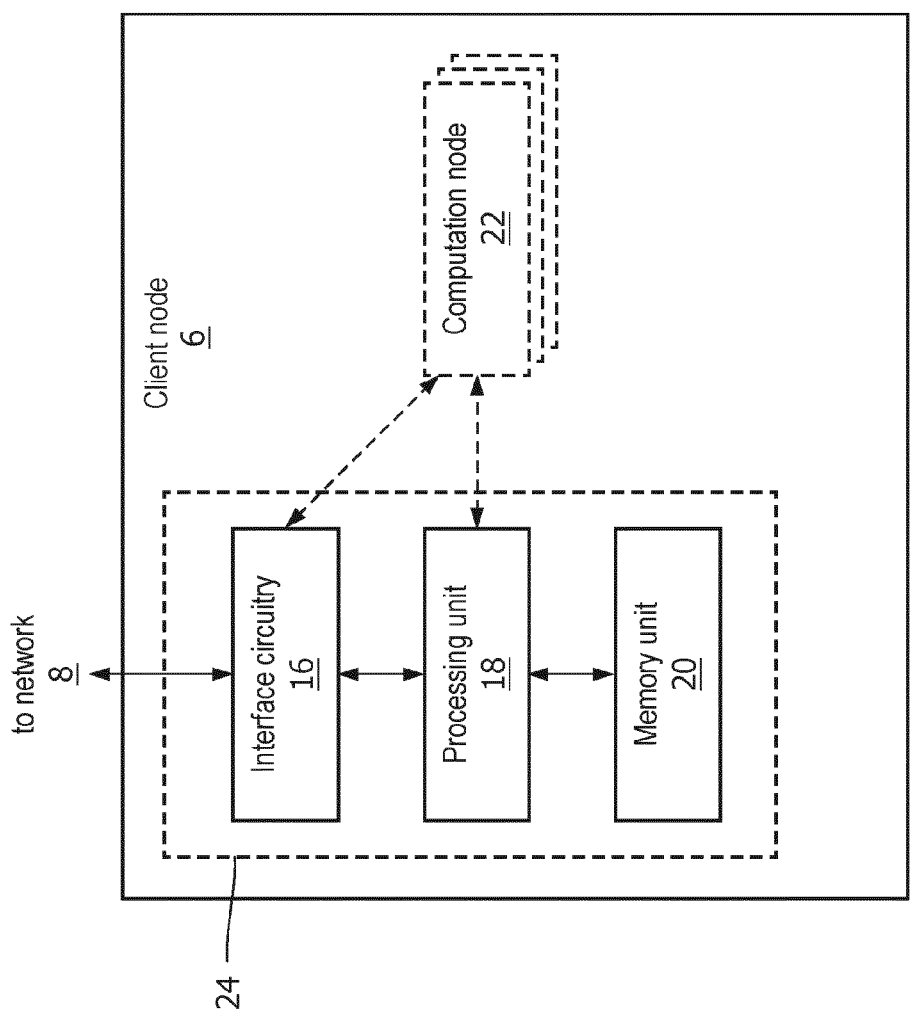
FIG. 2 is a block diagram of a client node.

FIG. 2 is a block diagram of a client node 6. The client node 6 includes interface circuitry 16 for enabling a data connection to other devices, such as the coordinator node 4 and other client nodes 6. In particular the interface circuitry 16 can enable a connection between the client node 6 and the network 8, such as the Internet, via any desirable wired or wireless communication protocol. The client node 6 further includes a processing unit 18 for performing operations and for generally controlling the operation of the client node 6. The client node 6 further includes a memory unit 20 for storing any data required for the execution of the techniques described herein and for storing computer program code for causing the processing unit 18 to perform method steps as described in more detail below.

The processing unit 18 and memory unit 20 can be implemented in numerous ways, similar to the processing unit 12 and memory unit 14 in the coordinator node 4.

If a client node 6 stores or holds one or more datasets that can be analysed in a multiparty computation, the dataset(s) can be stored in the memory unit 20.

The client node 6 may also include one or more computation nodes 22 that are controlled, instructed or operated by the processing unit 18 in the client node 6. A computation node 22 is a computing resource that can be used to execute part of a multiparty computation. A computation node 22 may be one or more processing cores or a processor within or associated with the processing unit 18 of the client node 6, or a computation node 22 may be a separate computing or electronic device to the part of the client node 6 that includes the processing unit 18. For example, each computation node 22 can be a separate computer, server, laptop, tablet, smartphone, etc., to the part of the client node 6 that includes the processing unit 18. This is indicated in FIG. 2 by the dashed box 24 around the interface circuitry 16, processing unit 18 and memory unit 20, and the processing unit 18 can communicate with the computation node(s) 22 via interface circuitry 16.

Each client node 6 can make one or more computation nodes 22 available for processing in a MPC or performing direct processing of one or more datasets of that client node 6. A list of available or participating client nodes 6 is public and known to the coordinator node 4. The coordinator node 4 may store this list in memory unit 14. As used herein, 'public' information (including the list of available or participating client nodes 6) is information that is available to any party or node that has access to the system 2.

As noted above, the coordinator node 4 is provided to coordinate a multiparty computation on one or more datasets in the system 2. The coordinator node can flexibly schedule different parts of the MPC among a number of the client nodes 6 in the system 2, thereby eliminating the need to fix two or three client nodes 6 beforehand and allowing for new client nodes 6 to be dynamically added into, or removed from, the system 2.

Thus, secure computations (MPCs) are performed on distributed datasets (i.e. datasets that are stored in different client nodes 6) in a peer-to-peer way, with different tasks of the MPC being performed by different "committees" consisting of computation nodes 22 operated by different client nodes 6. To make sure that the MPC is distributed in a way that respects the privacy requirements of the participating client nodes 6 and makes optimal use of the computational resources (i.e. the computation nodes 22), the coordinator node 4 determines how a MPC should be distributed among the available client nodes 6.

As used herein, the term "datasets" refers to data that is made available by one or more client nodes 6 for analysis or evaluation by other parties (client nodes 6 or other nodes). Each dataset provided by a client node 6 can be stored in memory unit 20. A client node 6 may make available for processing a number of datasets with a public schema. The schema is a description of the structure of a database, for example indicating that a database includes columns "ID", "Name", "Age", and is public (so not secret). It should be appreciated that not all parties necessarily provide datasets for analysis or evaluation (in which case those client nodes 6 provide computation nodes 22 for performing the evaluation). As an example, dataset type "survival" may be a table with columns "treatment", "att1", . . . , "attn.". Dataset type "demographics" may be a table with columns "SSN", "birth date", and "length". The list of datasets provided by each client node 6, possibly including some metadata, is public and can be managed by the coordinator node 4. An example of information that can be stored by the coordinator node 4 is shown in Table 1 below.

TABLE 1

| Client node name | Dataset name | Description | Dataset type | # records |
|---|---|---|---|---|
| Hospital A | surv1315 | Survival study 2013-2015 | survival | 120 |
| Hospital A | pop1 | Population | demographics | 8233 |
| Hospital B | surv1216 | Survival study 2012-2016 | survival | 189 |
| Hospital B | pop2 | Population | demographics | 3552 |
| Hospital C | pop3 | Population | demographics | 6410 |

Figure 3:
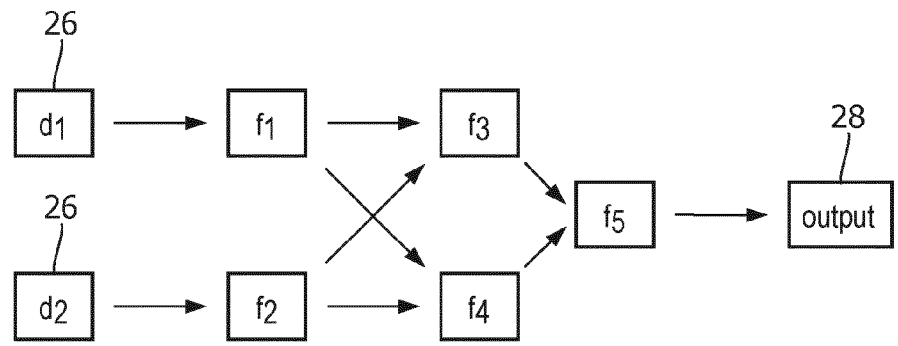
FIG. 3 is an example of a multiparty computation.

FIG. 3 shows an exemplary MPC that can be distributed by a coordinator node 4 according to the techniques described herein. This exemplary MPC requires the execution of a number of functions, labelled $f_1$ to $f_5$, on two different datasets 26, labelled $d_1$ and $d_2$ respectively to produce an output result 28. Each dataset 26 is to be processed individually by functions $f_1$ and $f_2$, with the results being used for two subsequent calculations $f_3$ and $f_4$. A final calculation $f_5$ combines the outcomes of $f_3$ and $f_4$ into one overall computation result 28.

Firstly a party, for example a researcher, via a node (e.g. a client node 6 or some other electronic device or computing device), sends to the coordinator node 4 a request for a computation to be performed on some dataset(s). The coordinator node 4 optionally checks that the computation is allowed. The coordinator node 4 then determines a computation schedule. The computation schedule splits the MPC up into different functions (which can be considered as subcomputations), and each function can either operate on exactly one dataset (in which case they are called "preprocessing tasks" or "preprocessing functions"), or on the output of one or more other functions (in which case they are called "processing tasks" or "processing functions"). It is assumed that each multiparty computation has a fixed computation schedule, meaning that the schedule (indicating which functions to compute in which order), is known ahead of time. For example, at the start of the computation it is known that function $f_5$ will be computed. This is in contrast to a situation where, for example, either $f_5$ or another function $f_6$ could be computed depending on intermediate results of the earlier functions. It is also assumed that the algorithms to perform these functions are public or common knowledge in the system 2.

In determining the schedule, the coordinator node 4 may take into account the availability of client nodes 4 in the system for providing a required dataset and/or for participating in the MPC. As noted above, a list of available or participating client nodes 6 is public and known to the coordinator node 4. This list may include meta-information such as a current processing load of the client node 6, which the client node 6 can notify to the coordinator node 4 intermittently or periodically (e.g. per second). Table 2 below shows the information contained in an exemplary list, such as a number of available client nodes 6, where node-a2, node-d1 and node-d2 are only available for performing a multiparty computation task, node-b1 is only available to provide access to one or more datasets, and the other client nodes 6 are available for both processing and providing one or more datasets. The location provides a general indication of the location of the client node (e.g. on a country level, e.g. Germany (DE), Ireland (IE), Netherlands (NL) or Canada), but it will be appreciated that the location can be provided at a much finer level of detail (e.g. by city) if required. The 'Cores used' refers to the number of processing cores that are currently in use (e.g. processing cores within the processing unit 18 of the client node 6 itself, or within the computation nodes 22).

TABLE 2

| Client node name | Node-id | Type | Location | Cores used | Tasks |
|---|---|---|---|---|---|
| Hospital A | node-a1 | small | eu-de | 3/4 | MPC/surv1315/pop1 |
| Hospital A | node-a2 | large | eu-ie | 0/4 | MPC |
| Hospital B | node-b1 | small | eu-ie | 0/4 | Surv1216/pop2 |
| Hospital C | node-c1 | large | eu-ie | 2/4 | MPC/pop3 |
| Cloud Provider D | node-d1 | large | eu-nl | 1/8 | MPC |
| Cloud Provider D | node-d2 | large | us-ca | 3/8 | MPC |

Assuming the underlying multiparty computation technique requires N parties (i.e. N client nodes 6) for each function of the privacy-preserving computation, the schedule assigns each function in the distributed computation to a respective committee formed of computation nodes 22 from N different parties (client nodes 6), with the exception of functions $f_1$ and $f_2$ that operate directly on datasets 26, that are each assigned to a single client node 6 that has access to the dataset 26. Typically for an MPC N is 2 or 3, but it will be appreciated that more than 3 client nodes 6 could participate in a particular MPC if required. Thus, in FIG. 3, a first computation node can be assigned to compute function $f_1$ on dataset $d_1$, a second computation node (in a different client node 6) can be assigned to compute function $f_2$ on dataset $d_2$, a first committee of computation nodes is used for computing function $f_3$ on the outputs of functions $f_1$ and $f_2$, a second committee of computation nodes is used for computing function $f_4$ on the outputs of functions $f_1$ and $f_2$ and a fifth committee of computation nodes is used for computing function $f_5$ on the outputs of functions $f_3$ and $f_4$. The computation nodes 22 forming each committee are from different client nodes 6, and in some cases a client node 6 is only involved in performing a single function in the MPC, i.e. the client node 6 (or computation nodes 22 thereof) are not involved computing multiple functions in the MPC. The schedule, or the relevant part of the schedule, is provided to the respective client nodes 6, so that each client node 6 knows which part of the MPC it is required to participate in. Thus, according to the schedule, the multiparty computation is carried out in a distributed way. Every committee of computation nodes 22/client nodes 6 performs the task (function) in the computation assigned to it, receiving its inputs from the preceding tasks(s) in the multiparty computation and providing its inputs to the next task(s) in the multiparty computation. The committee performing the final task of the multiparty computation (in this case, $f_5$), provides the output 28. This final committee can provide the output 28 to the party (e.g. researcher) that requested the computation.

Each multiparty computation is a well-defined and known computation task on a given list of datasets. The available families of (e.g. parameterized) computation tasks may be common knowledge in the system 2. For instance, families of computation tasks may include:

$age_{D_1, \ldots, D_n; X; A; M}$: Compute the average age of people in datasets $D_1, \ldots, D_n$ with value A for attribute X, as long as there are at least M such people.

$survival_{D_1, \ldots, D_n; X; A; M}$: Perform a logrank test on datasets $D_1, \ldots, D_n$ to decide whether there is a statistically significant difference between the survival curves for people with X=A and X≠A, with maximum time M.

Figure 4:
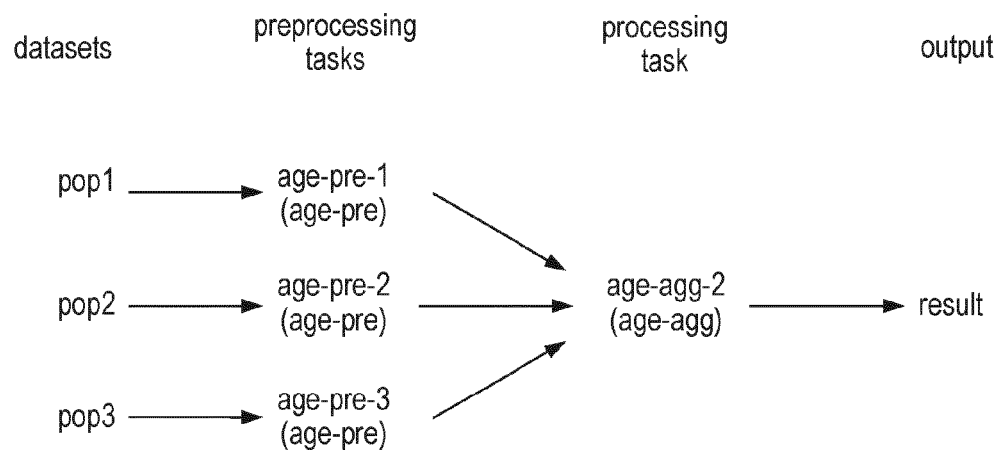
FIG. 4 is an example of a computation schedule.

As noted above, the "computation schedule" splits the MPC up into different functions. For example:

$age_{D_1, \ldots, D_n; X; A; M}$: consists of instances "age-pre-i" of a preprocessing task ("age-pre") for each dataset that determines the total age and number of people with X=A; and instance "age-agg-1" of a processing task ("age-agg") that divides the total sum by the total number and reveals it if the total number is at least M. FIG. 4 shows an exemplary computation schedule for $age_{D_1, \ldots, D_n; X; A; M}$ that shows the input datasets, the preprocessing tasks (functions) that are performed on those datasets, a processing task (function) that is performed on the result of the three preprocessing tasks, and the output.

$survival_{D_1, \ldots, D_n; X; A; M}$ consists of instances of a preprocessing task ("surv-pre") for each dataset that computes the total number of drop-outs at each time interval up to M; instances of a processing tasks ("surv-proc") that compute contributions to the test statistic for time intervals [1; 10), [10; 20), etc.; and an instance of a processing task ("surv-agg") that computes the final test statistic based on these inputs.

The computation schedule determined by the coordinator node 4 also includes a deployment map that maps each preprocessing task to a client node 6 that is available to process the relevant dataset, and each processing task to a coalition or committee of N computation nodes 22 from different client nodes 6 that are all available to perform multiparty computations. The deployment map may indicate specific computation nodes 22 that are to participate in the committee for each processing task (function), or the deployment schedule may indicate specific client nodes 6 that are to participate in the committee for each processing task (function), in which case each client node 6 can determine which computation node(s) 22 are to perform the evaluation of the function. Alternatively, the deployment map may only indicate specific computation nodes 22 for some client nodes 6, with other client nodes 6 being able to determine which of their computation node(s) 22 should perform the evaluation of the function.

For instance, continuing the example above, a deployment map for the computation schedule for $age_{pop1,pop2,pop3; X; A; M}$ from FIG. 4 with N=3 would deploy "age-pre-1" at node-a1, "age-pre-2" at node-b2; "age-pre-3" at node-c1; and "age-agg-1" at the committee {node-a1; node-c1; node-d1}. It will be noted that in this example node-a1 and node-c1 each perform a preprocessing task and a processing task.

Figure 5:
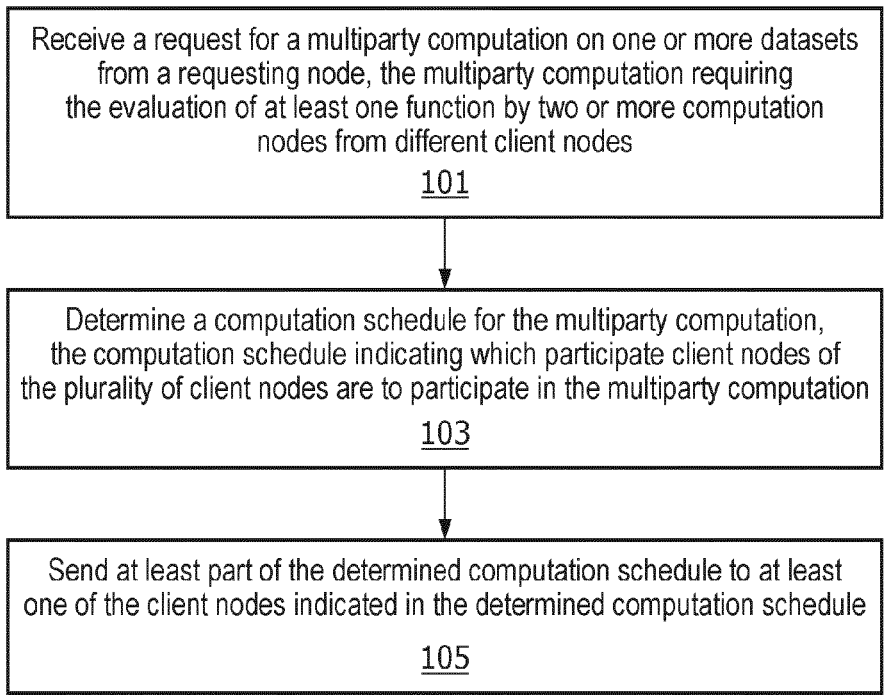
FIG. 5 is a flow chart illustrating a method of operating a coordinator node.

The flow chart in FIG. 5 illustrates a general method of operating a coordinator node 4 according to various embodiments. The method steps can be performed by the processing unit 12 of the coordinator node 4, in conjunction with the interface circuitry 10 and memory unit 14 as appropriate. The coordinator node 4 is for coordinating a multiparty computation on one or more datasets 26 in the system 2, and the system 2 includes a plurality of client nodes 6, with each client node 6 including one or both of at least one dataset 26 and at least one computation node 22.

In a first step, step 101, the coordinator node 4 receives a request for a multiparty computation from a requesting node. The multiparty computation requires the evaluation of at least one function by two or more computation nodes 22 from different client nodes 6. The multiparty computation may require the evaluation of multiple functions in order to determine the result, with at least one of those functions requiring evaluation by two or more computation nodes 6, and optionally one or more of the other functions requiring evaluation by at least one computation node 6 (e.g. in the case of a preprocessing function that operates directly on a dataset).

The request can indicate a particular computation, including a particular dataset or datasets on which the computation is to be performed. In an example, the requesting node can be a computer of a researcher that would like stored datasets to be analysed.

Continuing the above examples, the request could be for computation $age_{pop1,pop2,pop3; haircolor; brown; 10}$ or $survival_{surv1315,surv1216; treatment; yes; 20}$.

In some embodiments, before the requesting node can send the request to the coordinator node 4, the requesting node or the operator of the requesting node may be required to authenticate themselves to the coordinator node 4. For example the operator of the requesting node may be required to provide log-in details, including a user name and/or password, or other secret or other authentication information.

In some embodiments, the coordinator node 4 can check that the requested multiparty computation on the one or more of the datasets is permitted before proceeding further. The coordinator node 4 may check that the multiparty computation is permitted based on a global policy for the system 2. The global policy is applied to any request that is received by the coordinator node 4. The global policy may be based on any desired criteria, for example an identity of the requesting node or party, a maximum number of requests from the requesting party/node in a predetermined time period (e.g. a day, week, etc.), a maximum number of queries on a particular dataset or type of dataset, a restriction on types of datasets that particular types of requesting parties can request computations for, a maximum number of requests for a particular type of computation to be performed, etc. As specific examples, the global policy could specify that the request can be allowed or permitted if the researcher has not performed more than 100 queries today, or the request can be allowed or permitted if the researcher has not performed this type of query on the same datasets more than 20 times today, or the request can be allowed or permitted if the researcher has not been flagged by an external anomaly detection system that monitors the requests and/or action of the researcher, or the request can be allowed or permitted if for age-type queries the value of the parameter M is at least 10.

If the request is rejected as failing to comply with the global policy, then the request is rejected and the coordinator node 4 informs the requesting node accordingly.

If the request is permitted (or if no permission check is required to be performed on the received request), then the coordinator node 4 proceeds to determine a computation schedule for the multiparty computation (step 103). As noted above, the computation schedule splits the multiparty computation into different functions and indicates which client nodes 6 are to participate in executing or evaluating each function. As noted above, at least one of the functions requires evaluation by two or more computation nodes 22 from different client nodes 6. This type of function is referred to as a 'processing function' above.

In some cases the multiparty computation includes multiple functions that each require evaluation by two or more computation nodes 22 from different client nodes 6 (i.e. there are multiple processing functions), and the computation schedule can indicate which client nodes 6 are to participate in executing or evaluating each function. In these cases, the coordinator node 4 will select client nodes 6 for the computation schedule in such a way that it satisfies security requirements.

The multiparty computation may also include one or more functions, referred to as 'preprocessing functions' above that operate directly on a dataset and can be performed by or at a single client node 6. In this case the computation schedule indicates which client node 6 is to perform each of these preprocessing functions.

The computation schedule can indicate, for each client node 6 that is to evaluate a function in the multiparty computation, any one or more of the identity of any other client node 6 that is to provide an input for the evaluation of the function by the client node 6, the identity of one or more other client nodes that are to evaluate the function with the client node 6, and the identity of any other client node 6 that the client node 6 is to provide the output of the evaluation of the function to.

For example, based on the example above described with reference to FIG. 4, the computation schedule can indicate that node-a1 is assigned the preprocessing function "age-pre-1" on dataset (input) pop1, and that the output of the preprocessing function should be used by node-a1 in the committee of node-a1, node-c1 and node-d1 to evaluate function "age-agg-1". Likewise, the computation schedule can indicate that node-d1 is to evaluate the processing task "age-agg-1" with node-a1 and node-c1, that node-d1 is to receive inputs for that evaluation from node-a1, node-b2 and node-c1, and that node-d1 is to output the result of the evaluation to the requesting node.

As noted above the computation schedule may indicate specific computation nodes 22 that are to evaluate each function, or the computation schedule may indicate client nodes 6 that are to evaluate each function. In the latter case each client node 6 can then determine which of its computation node(s) 22 are to perform the evaluation of the function. Alternatively, for example depending on a preference of a client node 6 to determine which computation nodes 22 should evaluate a function, the computation schedule may indicate specific computation nodes 22 for some of the functions, and otherwise generally indicate client nodes 6 for the remaining functions.

In addition to indicating the client nodes 6/computation nodes 22 that are to evaluate the function or functions in the multiparty computation, the computation schedule can also indicate one or more client nodes 6 that are to provide a dataset for use in the multiparty computation.

The computation schedule can be determined in a number of different ways. In one approach, the coordinator node 4 can determine the computation schedule by determining a set of possible computation schedules for the multiparty computation, with each possible computation schedule indicating client nodes 6 that could evaluate each function (processing or preprocessing) in the multiparty computation. The coordinator node 4 then evaluates each possible computation schedule according to one or more criteria to determine whether each possible computation schedule is suitable, and determines the computation schedule to use based on any possible computation schedule that meets the criteria, or the possible computation schedule that best meets the criteria. Any possible computation schedule that does not meet (one or more of the) criteria can be discarded from the set of possible computation schedules.

In a modification to this approach, rather than determine a set of possible computation schedules, the coordinator node 4 can determine a set of possible committees of client nodes 6 for each of the processing functions that are to be evaluated by multiple client nodes 6, and the possible committees can be evaluated according to one or more criteria to identify whether each committee is suitable. The computation schedule for the overall multiparty computation can then be formed based on suitable committees that have been identified for each of the functions. It will be appreciated that in this case one of the criteria applied to the set of possible committees is that no client node 6 should be involved in the evaluation of multiple processing functions in the multiparty computation.

In some embodiments the criteria to be used to evaluate the set of possible computation schedules or set of possible committees for each function can be divided into a number of "hard" criteria and a number of "soft" criteria. Hard criteria are criteria that each computation schedule/committee should satisfy, for example that:

Functions are deployed at client nodes 6 with relevant resources (e.g. access to the required datasets, willingness to perform an MPC).
The client nodes 6 in a coalition/committee need to be different.
Client nodes 6 have computational resources (e.g. computational nodes 22) available.
All processing of age queries involving datasets from a particular location or region (e.g. the EU) should be performed in that location or region (e.g. in the EU).

Soft criteria are typically preferences for the computation schedule/committee that do not necessarily need to be satisfied, but could provide a way to identify a preferred computation schedule from a subset of the possible computation schedules that meet the hard criteria. For example, the soft criteria can include that:

Client nodes 6 in a committee should preferably be geographically close (e.g. to reduce latency in communications between them).
Client nodes 6 with more computation nodes 22/processing cores available are preferred over client nodes 6 with computation nodes 22/processing cores available.

As noted above, a set of possible computation schedules or possible committees can be determined, and any possible computation schedule or possible committee that does not satisfy the hard criteria can be filtered out or discarded. The remaining computation schedules or committees can then be scored according to the soft criteria; e.g. providing a value between 0 and 1 representing the normalized summed geographic distance between the client nodes 6 in a committee, and a value between 0 and 1 representing the normalized total number of available computation nodes 22 in the committee. Finally, an algorithm, e.g. a weighted random selection algorithm, can be used to select a computation schedule or a committee for each function to be evaluated from this list.

Continuing the above example, the computation schedule of $age_{pop1,pop2,pop3;haircolor;brown;10}$ consists of three preprocessing functions and one processing function. The size of each committee is 3 (i.e. N=3). Table 3 below lists all possible computation schedules satisfying the four hard criteria listed above, scored according to the two soft criteria.

TABLE 3

| age-pre-1 | age-pre-2 | age-pre-3 | age-agg-1 | Dist (Norm) | | Avail (Norm) | |
| --- | --- | --- | --- | --- | --- | --- | --- |
| node-a1 | node-b1 | node-c1 | node-a1, node-c1, node-d1 | 2589 | 0.99 | 11 | 0.85 |
| node-a1 | node-b1 | node-c1 | node-a2, node-c1, node-d1 | 1842 | 1.00 | 13 | 1.00 |

In this case, the first computation schedule (in row 1 of Table 3) will be chosen with probability (0.99+0.85)/(0.99+

0.95+1+1)≈0.48; the second computation schedule (in row 2 of Table 3) will be chosen with probability (1+1)/(0.99+ 0.95+1+1)≈0.52.

In either of the above approaches, in determining the computation schedule the coordinator node 4 can monitor the availability of the client nodes 6 for multiparty computations over time. That is, the coordinator node 4 can receive information from each of the client nodes 6 indicating the current availability of the client node 6 for multiparty computations, or receive information from each of the client nodes 6 on the current availability of one or more computation nodes 22 for a client node 6. The coordinator node 4 can take this information into account to determine the computation schedule based on client nodes 6 that are currently available.

Once the computation schedule has been determined, the coordinator node 4 sends at least part of the computation schedule to at least one of the client nodes 6 indicated in the computation schedule (step 105). In some embodiments the coordinator node 4 sends any part of the computation schedule indicating a particular client node 6 to that client node 6. In this case, the coordinator node 4 only sends the parts of the computation schedule concerning a particular client node 6 to that client node 6, and it does not send parts of the computation schedule concerning other client nodes 6 to that client node 6. In alternative embodiments, the coordinator node 4 can send the determined computation schedule to each of the client nodes 6 indicated in the computation schedule. In this case each client node 6 that is to take part in the multiparty computation receives the full computation schedule.

The part of the computation schedule sent to each client node 6 (or the whole computation schedule, if appropriate) includes information required by client nodes 6 to perform their part of the multiparty computation. In particular, the information can include any one or more of the identity of any other client node 6 that is to provide an input for the evaluation of the function by the client node 6, the identity of one or more other client nodes that are to evaluate the function with the client node 6, the identity of the function that the client node 6 is to evaluate, and the identity of any other client node 6 that the client node 6 is to provide the output of the evaluation of the function to.

For instance, in the first computation schedule from Table 3:
- node-a1 learns that it should perform preprocessing function "age-pre-1" of type "age-pre" on dataset pop1", and provide the result to committee {node-a1; node-c1; node-d1}.
- node-b1 learns that it should perform preprocessing function "age-pre-2" of type "age-pre" on dataset pop2", and provide the result to committee {node-a1; node-c1; node-d1}.
- node-c1 learns that it should perform preprocessing function "age-pre-3" of type "age-pre" on dataset pop3", and provide the result to committee {node-a1; node-c1; node-d1}
- node-a1, node-c1 and node-d1 learn that they should perform task "age-agg-1" of type "age-agg" with {node-a1; node-c1; node-d1} on inputs from node-a1, node-c1 and node-d1, and output the result to researcher johndoe1.

As noted above, the computation schedule can indicate a particular computation nodes 22 in particular client nodes 6 that are to evaluate each function. Alternatively, the computation schedule can indicate particular client nodes 6 that are to evaluate each function, and the indicated client node 6 can determine which of its computation nodes 22 are to perform the evaluation. This may be the case regardless of whether the particular client node 6 has one or multiple computation nodes 22 available to participate in the multiparty computation.

In an alternative approach to determining the computation schedule in step 103, rather than determine the full computation schedule before the multiparty computation is started, the coordinator node 4 can dynamically determine the computation schedule as the multiparty computation is being performed. In this case, the coordinator node 4 can determine the computation schedule for the next function evaluation on completion of the evaluation of the previous function(s). This enables the coordinator node 4 to determine the computation schedule for upcoming function evaluations based on the most up-to-date information on the availability of client nodes 6 for performing the evaluation.

This approach means that, when a client node 6 is instructed according to the computation scheduled determined so far to perform an evaluation of a function, the client node 6 does not yet know which other client node 6 or committee of client nodes 6 the result of the evaluation should be provided to. Instead, when a function evaluation is completed, the client node 6 can contact the coordinator node 4. As soon as the coordinator node 4 finds that all inputs for a particular committee are ready, it decides which client nodes 6 are to form the committee, and provides the information about these client nodes 6 to the client nodes 6 that performed the previous evaluation and informs the relevant client nodes 6 that they are to evaluate the next function.

The committees can be identified in a similar way to the identification of the committees in the static schedule approach described above. That is, a set of possible committees can be determined for the next function to be evaluated, and a committee to use identified using one or more criteria. For example the set of possible committees can be filtered based on hard criteria as described above, and the remaining possible committees ranked according to the soft criteria. The committee to use can then be selected based on a randomized choice.

Once the computation schedule has been sent to the relevant client nodes 6, the multiparty computation can be performed. In some embodiments the requesting node may have an input for the multiparty computation. The input may be a dataset from the requesting node that is not otherwise available in the system 2, or it may be any other type of suitable information. The coordinator node 4 may receive the input from the requesting node, and provide this to one or more of the client nodes 6 as required. Alternatively, in determining the computation schedule, the coordinator node 4 can treat the input from the requesting node as a dataset, with the requesting node in effect performing a preprocessing function. In some implementations, measures can be taken to ensure that a requesting node provides valid and consistent inputs. For example the verifiable secret sharing scheme described in "A practical scheme for non-interactive verifiable secret sharing" by Paul Feldman can be used in which, for each input, the requesting node determines secret shares and encryptions of the secret and randomness used, and these encryptions are provided to the coordinator node 4, which provides them to the client nodes 6 that receive the input. The requesting party can then provide the secret shares to the relevant client nodes 6/computation nodes 22 that can use the encryptions to verify that their received shares are valid and consistent.

Apart from providing the schedule (and any input from the requesting node, if appropriate), the computation is performed without any further input by the coordinator node 4.

The following provides a particular example of how a distributed multiparty computation can be performed and results provided to a researcher (requesting node). In this example, the committee size, N is 3. The computations are secure as long as the communication of at most one client node 6 per committee is eavesdropped, and no input node or client node 6 is actively corrupted. The execution or evaluation of a processing function is carried out in a size 3 committee using 1-out-of-3 Shamir secret sharing (e.g., as described in "Design of large scale applications of secure multiparty computation: secure linear programming" by Sebastiaan de Hoogh and references therein). When data (e.g. a function output) needs to pass from a preprocessing function to a processing function, the client node 6 that performs the preprocessing function secret-shares the data between the client nodes 6 performing the processing. When data needs to pass from one processing function to another, one client node 6 of the first processing function can provide its secret shares to one client node 6 of the second processing function, and so on. The coordinator node 4 can select which client nodes 6 should provide the shares to each other (and this can be indicated in the computation schedule), following the constraint that if computation nodes 22 from the same client node 6 are present in both functions, they should pair up to exchange shares. When the same data/value is output to multiple other functions, or when the data/value was one of the original inputs to the function, it can be re-randomized by adding a new sharing of zero prior to being output. When data needs to pass from a processing task the researcher (requesting party), the client nodes 6 send secret shares of the result to the researcher, who performs recombination to obtain the plaintext result.

In some embodiments, the above embodiments based on secret sharing can be augmented with the option to audit some of the function evaluations via "spot checks". Each client node 6/computation node 22 can collect "auditing information" during the evaluation of its function so that each client node 6/computation node 22 can later independently produce its part of an overall proof that the function was evaluated correctly. After an evaluation is completed (either straight away before the next function is evaluated or once the whole multiparty computation has been completed), the coordinator node 4 can decide whether or not to perform auditing of the MPC, or part of the MPC. If so, all client nodes 6/computation nodes 22 participating in the MPC or relevant part of the MPC produce their part of the proof, the coordinator node 4 collects all proofs and verifies their correctness. If an overall computation proof does not verify, the coordinator node 4 can identify a committee that wrongly executed a part of the MPC. The coordinator node 4 can then notify the client nodes 6 of that committee. If the auditing information is stored, the audit can also be performed a lot later, for example years later during an official audit. In some cases, the failing of a "spot check" can have consequences for the client node(s) 6 involved. For example, trust in that client node 6 can be lost, after which the client node 6 is not allowed to participate in further computations.

In an alternative approach, the client node(s) 6 contributing the datasets to the MPC can jointly decide whether or not auditing should take place. For example, the client nodes 6 providing datasets can perform an actively secure distributed coin toss protocol (e.g. they each pick random bitstrings, broadcast commitments, and open them; with the resulting random bitstring being the XOR of all of these bitstrings) and decide whether to request auditing based on the outcome. For instance, client nodes 6 can choose 10-bit bitstrings and perform auditing if the XOR of these bitstrings is 0000000000, which would mean that 1 in 1024 computations is audited. Client nodes 6 that perform the function evaluations produce proof parts and provide them to the client nodes 6 that contributed the datasets.

In a further embodiment, the coordinator node 4 may request one or more of the client nodes 6 indicated in the computation schedule to store their internal state after the evaluation of their function, for example indefinitely or up to a maximum amount of time. The computation node 4 can do this where the internal state may be useful in the future, for example if another processing function (evaluated by another client node 6) can make use of this state during evaluation of another function. In that case, the coordinator node 4 can request the client node 6 to send the stored state to another client node 6 to avoid that client node 6 from having to recompute that state.

Figure 6:
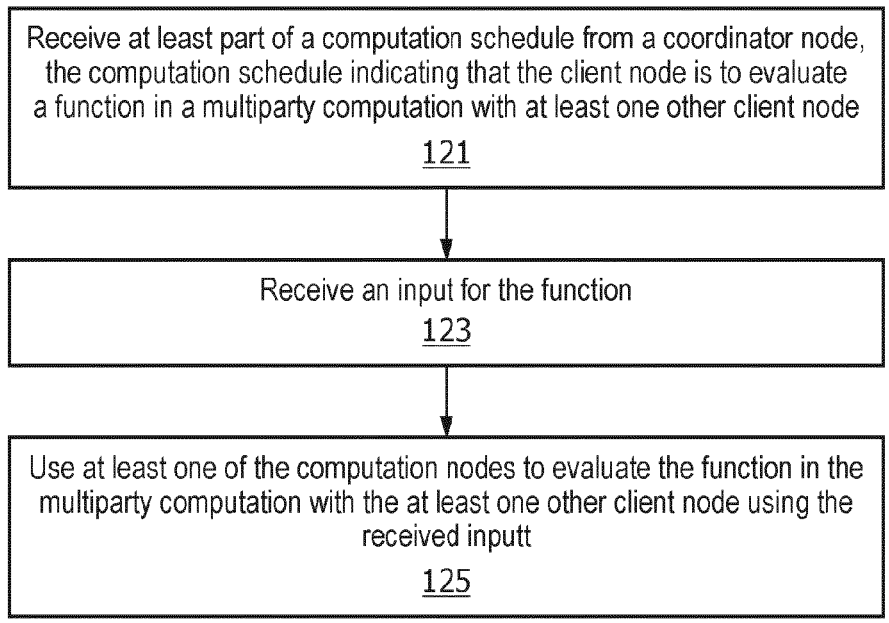
FIG. 6 is a flow chart illustrating a method of operating a client node.

FIG. 6 is a flow chart illustrating a method of operating a client node 6 in a system 2 according to the techniques described herein. The method steps can be performed by the processing unit 18 of the client node 6, in conjunction with the interface circuitry 16 and memory unit 20 as appropriate. The system 2 includes a coordinator node 4 and a plurality of client nodes 6, with the client node 6 in the method of FIG. 6 including at least one computation node 22.

In a first step, step 121, the client node 6 receives at least part of a computation schedule from the coordinator node 4. As described above, the computation schedule indicates that the client node 6 is to evaluate a function (i.e. a processing function) in the multiparty computation with at least one other client node 6. The computation schedule may indicate a particular computation node 22 of the client node 6 that is to perform the evaluation, or the computation schedule may simply indicate that the client node 6 is to provide a computation node 22 to evaluate the function. In the latter case, if the client node 6 includes multiple computation nodes 22, the client node 6 can determine which of the computation nodes 22 is to perform the evaluation. This can be determined on, for example, the current processing load of the computation nodes 22.

The received computation schedule may indicate any one or more of the identity of any other client node 6 that is to provide an input for the evaluation of the function by the client node 6, the identity of one or more other client nodes 6 that are to evaluate the function with the client node 6, and the identity of any other client node 6 that the client node 6 is to provide the output of the evaluation of the function to.

When the client node 6 is to evaluate the function, the client node 6 receives an input for the function (step 123). The input may be a dataset, a dataset that has been preprocessed by another client node 6, or the output of a previous processing function in the multiparty computation. Depending on the type of input, the input may be received from the coordinator node 4, a party that requested the multiparty computation or another client node 6.

The client node 6 then uses at least one of its computation nodes 22 to evaluate the function in the multiparty computation (step 125). This evaluation is performed on the received input in conjunction with at least one other client node 6. The processing unit 18 of the client node 6 can provide the received input and any other relevant information (for example information from the received computation schedule) to the computation node 22 to enable the computation node 22 to perform the evaluation.

The output of the evaluation of the function can be sent by the client node 6 to another client node (for example a client node 6 that evaluates the next function in the multiparty computation) or to a node that requested the multiparty computation.

In some embodiments, to enable a coordinator node to determine the computation schedule, the client node 4 can indicate its availability for multiparty computations over time to the coordinator node 4. This availability may include information indicating the availability of each of the computation nodes 22 of the client node 6.

In some embodiments, the client node 6 can receive a request from the coordinator node 4 to store the internal state of the client node 6 after evaluation of the function in step 125. In response to this request, the client node 6 can store the internal state, and can send the internal state of the client node 6 to another client node 6 as required (for example if requested to do so by the coordinator node 4).

It will be appreciated that the techniques described herein can be applied in a number of different fields and settings. Generally the techniques described herein can be applied in settings where sensitive valuable data is present at different parties (client nodes 6), and these parties are willing to make their data available for processing, but there is no obvious trusted third party available to do the processing. One example of this is the HealthSuite Digital Platform, where hospitals may not wish to make their most sensitive data available for processing in the clear, but it is nevertheless desirable to analyse this data. In particular, one example application is distributed medical research where medical researchers from different hospitals want to be able to perform research on the joint datasets from these hospitals.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising a coordinator node for coordinating a multiparty computation on one or more datasets, a plurality of client nodes, one or more datasets, and a plurality of computation nodes, wherein each client node comprises one or both of at least one dataset and at least one computation node that can operate as a party to a multiparty computation, wherein the coordinator node comprises a processor that:
  receives a request for a multiparty computation on one or more of the datasets from a requesting node, the multiparty computation requiring the evaluation of at least one function by two or more computation nodes from different client nodes;
  determines a computation schedule for the multiparty computation, the computation schedule indicating which client nodes of the plurality of client nodes are to participate in the multiparty computation; and
  sends at least part of the determined computation schedule to at least one of the client nodes indicated in the determined computation schedule,
  wherein the coordinator node checks that the multiparty computation is permitted based on one or more of a number of requests received from the requesting node in a predetermined time period and an identity of the one or more datasets that the multiparty computation is to be performed on; and
  wherein the at least one of the client nodes comprises at least one computation node that evaluates the at least one function in the multiparty computation based on the received part of the determined computation schedule.

2. The system as claimed in claim 1, wherein the processor of the coordinator node:
  checks that the requested multiparty computation on the one or more of the datasets is permitted before determining the computation schedule.

3. The system as claimed in claim 2, wherein the processor of the coordinator node checks that the multiparty computation is permitted based on a global policy for the system.

4. The system as claimed in claim 2, wherein the processor of the coordinator node checks that the multiparty computation is permitted based on an identity of the requesting node, the number of requests received from the requesting node in a predetermined time period, and the identity of the one or more datasets that the multiparty computation is to be performed on.

5. The system as claimed in claim 1, wherein the processor of the coordinator node sends any part of the determined computation schedule indicating a particular client node to that client node.

6. The system as claimed in claim 1, wherein the processor of the coordinator node sends the determined computation schedule to each of the client nodes indicated in the computation schedule.

7. The system as claimed in claim 1, wherein the processor of the coordinator node:
  receives an input to the multiparty computation from the requesting node; and
  provides the input to one or more of the client nodes indicated in the computation schedule.

8. The system as claimed in claim 1, wherein the multiparty computation requires the evaluation of a plurality of functions by two or more client nodes, and wherein the determined computation schedule indicates a respective set of two or more client nodes of the plurality of client nodes for each of the functions.

9. The system as claimed in claim 1, wherein the computation schedule indicates, for each client node that is to evaluate a function in the multiparty computation, (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

10. The system as claimed in claim 1, wherein the computation schedule further indicates one or more client nodes that are to provide a dataset for the multiparty computation.

11. The system as claimed in claim 1, wherein the multiparty computation further comprises at least one preprocessing function that is to be performed on one of the one or more datasets, and wherein the computation schedule further indicates a client node that is to perform the preprocessing function on the one of the one or more datasets.

12. The system as claimed in claim 1, wherein the processor of the coordinator node:
monitors the availability of the plurality of client nodes for multiparty computation over time; and
wherein the coordinator node is configured to determine the computation schedule based on client nodes that are currently available.

13. The system as claimed in claim 1, wherein the processor of the coordinator node determines the computation schedule by determining which client nodes are to evaluate a next function in the multiparty computation on completion of the evaluation of a previous function in the multiparty computation.

14. The system as claimed in claim 13, wherein the processor of the coordinator node:
monitors the availability of the client nodes for multiparty computation over time; and
determines which client nodes are to evaluate each function in the multiparty computation on completion of the evaluation of the previous function in the multiparty computation based on the availability of the client nodes.

15. The system as claimed in claim 1, wherein the processor of the coordinator node determines the computation schedule by:
determining a set of possible computation schedules for the multiparty computation, each possible computation schedule indicating client nodes in the plurality of client nodes that could evaluate each function in the multiparty computation;
evaluating each possible computation schedule according to one or more criteria; and
determining the computation schedule based on the evaluation.

16. The system as claimed in claim 15, wherein the processor of the coordinator node discards any possible computation schedule that does not meet one or more of the one or more criteria; and to determine the computation schedule based on the remaining possible computation schedules.

17. The system as claimed in claim 1, wherein the processor of the coordinator node determines the computation schedule by:
determining a set of possible committees for the function requiring evaluation by two or more computation nodes from different client nodes, each possible committee comprising two or more client nodes that could evaluate each function in the multiparty computation;
evaluating each possible committee according to one or more criteria;
determining a committee for the function based on the evaluation; and
determining the computation schedule including the determined committee.

18. The system as claimed in claim 17, wherein the processor of the coordinator node discards any possible committee that does not meet one or more of the one or more criteria; and to determine the committee for the function based on the remaining possible committees.

19. The system as claimed in claim 1, wherein the processor of the coordinator node requests one or more of the client nodes indicated in the computation schedule to store their internal state after evaluation of said function.

20. A client node for use in a system, wherein the system comprises a coordinator node and one or more other client nodes, wherein the client node comprises at least one computation node that can operate as a party to a multiparty computation, wherein the client node comprises a processor that:
receives at least part of a computation schedule from the coordinator node, the computation schedule indicating that the client node is to evaluate a function in the multiparty computation with at least one other client node;
receives an input for the function; and
uses at least one of the computation nodes to evaluate the function in the multiparty computation with the at least one other client node using the received input,
wherein the multiparty computation is permitted based on one or more of a number of requests received from a requesting node in a predetermined time period and an identity of one or more datasets that the multiparty computation is to be performed on.

21. The client node as claimed in claim 20, wherein the client node comprises a plurality of computation nodes, and the processor:
determines which of the plurality of computation nodes is to evaluate the function in the multiparty computation.

22. The client node as claimed in claim 20, wherein the processor:
receives an input to the multiparty computation from the coordinator node.

23. The client node as claimed in claim 20, wherein the computation schedule indicates (i) the identity of any other client node that is to provide an input for the evaluation of the function by the client node, (ii) the identity of one or more other client nodes that are to evaluate the function with the client node, and/or (iii) the identity of any other client node that the client node is to provide the output of the evaluation of the function to.

24. A method of operating a client node in a system, wherein the system comprises a coordinator node and one or more other client nodes, wherein the client node comprises at least one computation node that can operate as a party to a multiparty computation, wherein the method comprises:
receiving at least part of a computation schedule from the coordinator node, the computation schedule indicating that the client node is to evaluate a function in the multiparty computation with at least one other client node;
receiving an input for the function; and
using at least one of the computation nodes to evaluate the function in the multiparty computation with the at least one other client node using the received input,
wherein the multiparty computation is permitted based on one or more of a number of requests received from a requesting node in a predetermined time period and an identity of one or more datasets that the multiparty computation is to be performed on.

25. The method as claimed in claim 24, wherein the client node comprises a plurality of computation nodes, and the method further comprises:
determining which of the plurality of computation nodes is to evaluate the function in the multiparty computation.

* * * * *